United States Patent [19]
Boris et al.

[11] 3,979,087
[45] Sept. 7, 1976

[54] ENGINE MOUNT

[75] Inventors: Paul A. Boris, Ellington; Jon A. Marx, Manchester, both of Conn.

[73] Assignee: United Technologies Corporation, Hartford, Conn.

[22] Filed: July 2, 1975

[21] Appl. No.: 592,440

[52] U.S. Cl. .................................... 244/54; 248/5
[51] Int. Cl.² ........................................ B64D 27/18
[58] Field of Search ..................... 244/54; 248/5; 60/39.31

[56] References Cited
UNITED STATES PATENTS 3,006,587 10/1961 Jumelle et al. ............................ 248/5
3,217,490 11/1965 Chilvers ............................ 244/54 X Primary Examiner—Trygve M. Blix
Assistant Examiner—Barry L. Kelmachter
Attorney, Agent, or Firm—Norman Friedland

[57] ABSTRACT

The loads manifested by and imposed on the engine are transmitted through a mounting formed on a single plane with a three point attachment permitting the engine to be cantilever mounted although not limited thereto, and allows for the engine to project considerably forward of an airfoil section to which it is attached.

6 Claims, 4 Drawing Figures

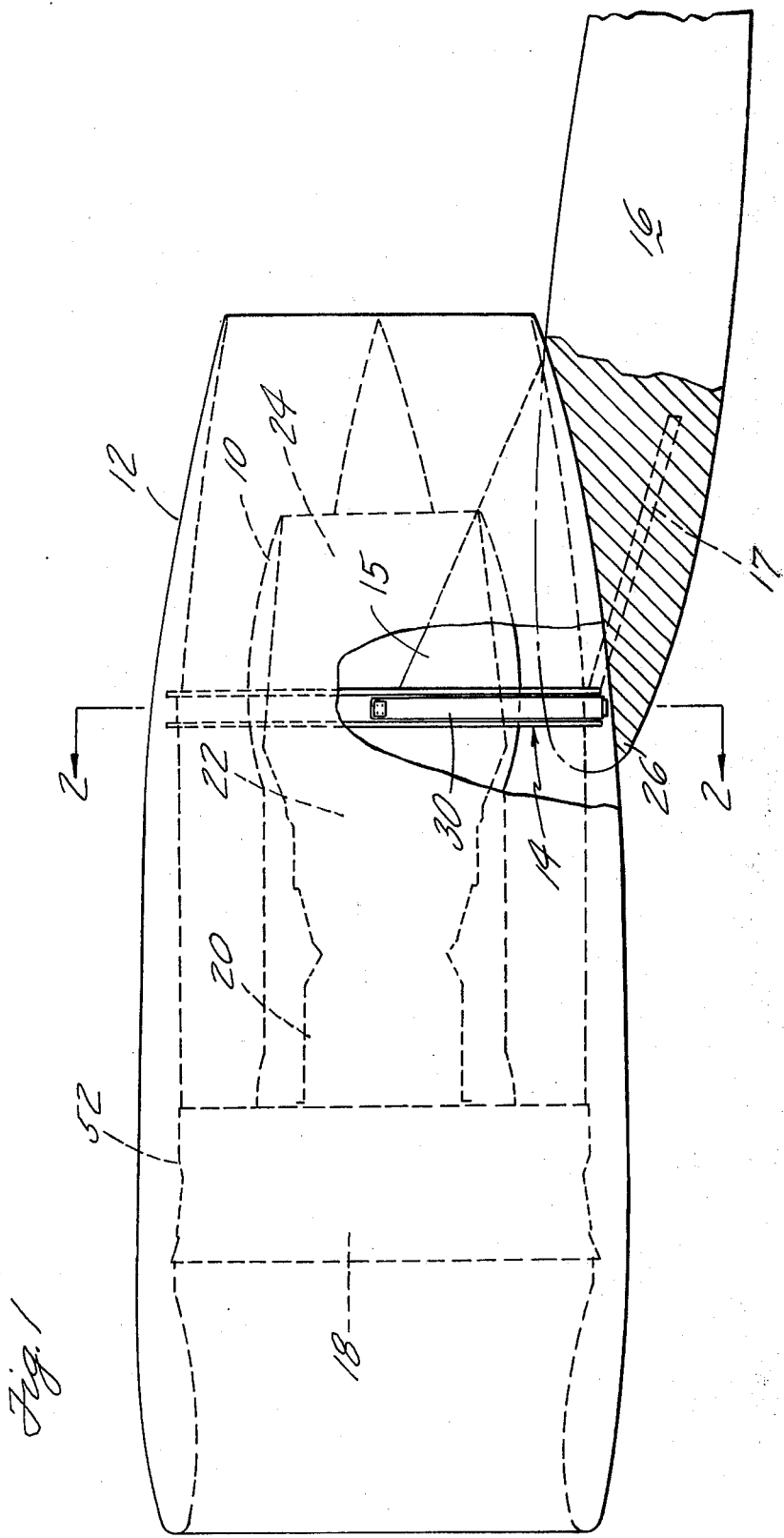

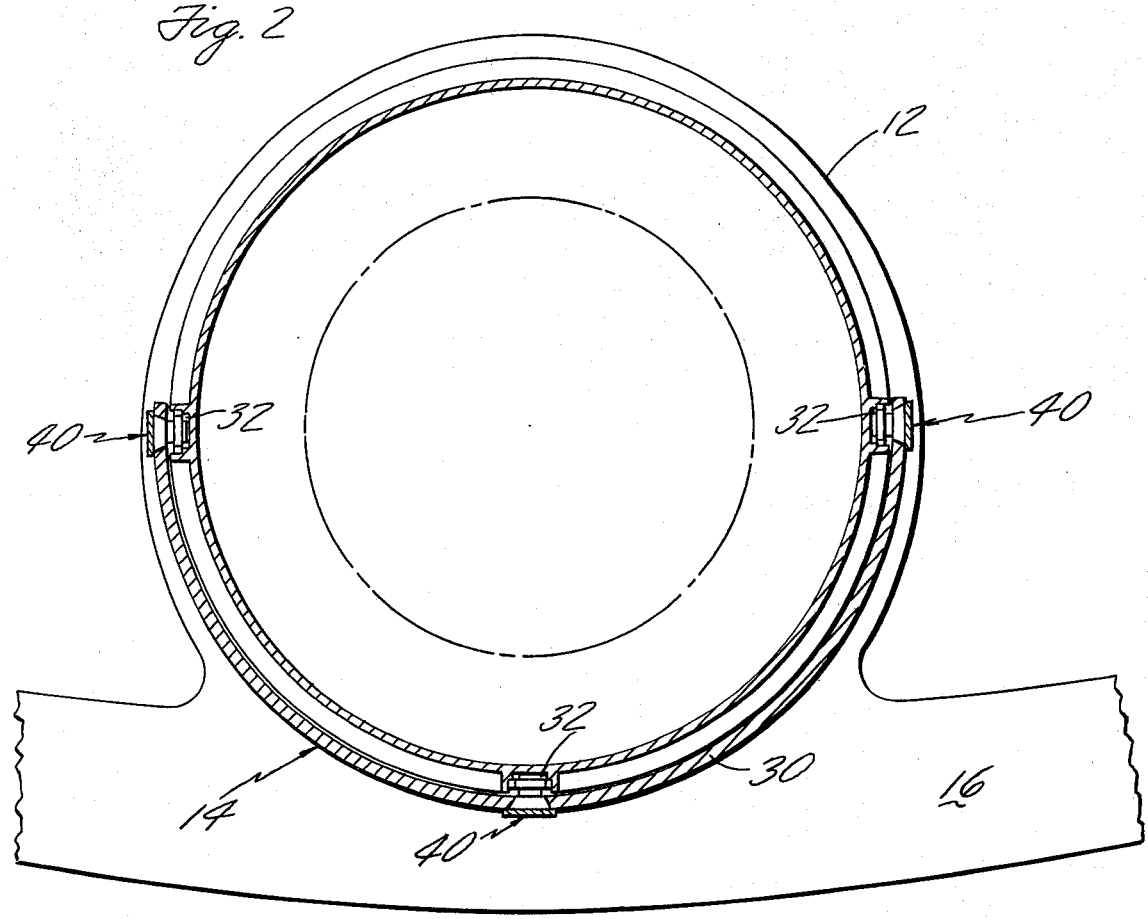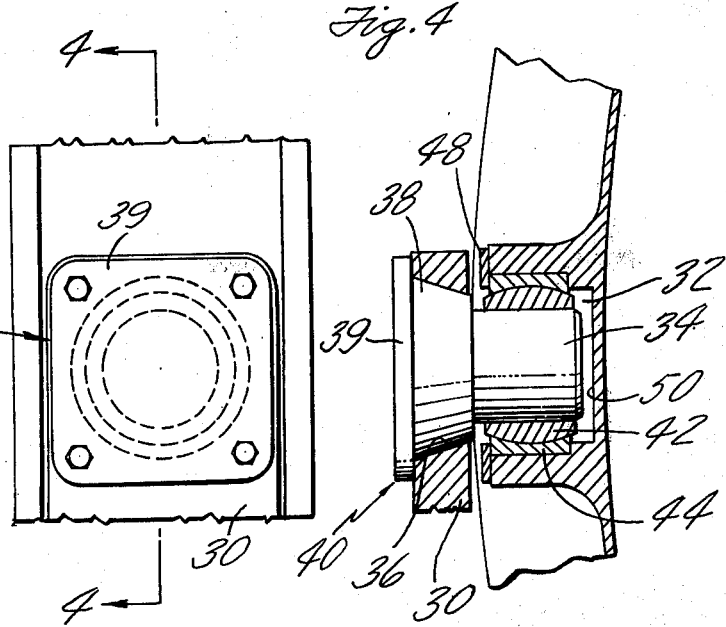

ENGINE MOUNT

BACKGROUND OF THE INVENTION

This invention relates to a gas turbine engine mount system and is particularly applicable to the mounting system of the engine to aircraft.

Historically, and conventionally the engine is typically mounted to the airframe by including structural load carrying members in the nacelle, pod, or pylon and attaching the engine to the airframe at least at two different planes along the axis of the engine. In certain installations where swivel-trunnion joints are utilized the trunnions may be either attached to the nacelle or engine case and the complementing swivel may be attached to the engine case or nacelle respectively. This becomes a design trade-off to determine the distribution of local bending moments between the nacelle and the engine.

It is also conventional in installations that utilize three swivel trunnion joints in a single plane to have the joints formed in various combinations of fixed and sliding joints which is predicated on where and how the additional point of support is applied. As for example, U.S. Pat. No. 3,006,587 granted to L. F. Junelle et al on Oct. 31, 1961 discloses a three swivel-trunnion joint (fixed and sliding) mounted in proximity to the engine's center of gravity (C.G.) and includes at another plane, a linkage support arrangement spaced fore or aft of the plane of the three swivel-trunnion joint.

We have found that we can simplify the mounting system of the engine to the airframe by locating three joints in a single plane transverse to the engine axis, where all the joints are fixed, save for a small radial movement on each joint to account for thermal expansion, wherein all of the applied loads (thrust, vertical, side and torque) are resolved in a single plane. While the plane may be selected close to the C.G. of the engine, this invention particularly contemplates the cantilever support of the engine. Obviously, the location of the mount system must be limited by the engine construction inasmuch as it must be located in proximity to a location in the engine where there is adequate rigid stiffness, as where the main bearings may be supported.

Additionally, this invention has the advantage of obviating the ovalization problem associated with thrust loadings that is sometimes evident in a multiple plane mounting system. This is particularly applicable in relatively long engine duct installations as is shown in the preferred embodiment. Hence by virtue of the invention the thrust load is spread out and carried uniformly through the fan exit case and long duct to the concentrated load attachment points.

SUMMARY OF THE INVENTION

The object of this invention is to provide an improved mounting system for attaching the gas turbine engine to the airframe.

A still further object of this invention is to provide an improved mounting system as described by resolving all the engine loads in a single plane, located transverse to the engine axis.

A still further object of this invention is to provide a single plane mount for attaching the engine to the aircraft wherein the engine inlet can be located considerably fore of the supporting airframe and can be cantilever mounted so as to eliminate the necessity of including the load carrying structure in the nacelle.

Other features and advantages will be apparent from the specification and claims and from the accompanying drawings which illustrate an embodiment of the invention.

BRIEF DESCRIPTION OF THE DRAWINGS

FIG. 1 is a side elevation and partial view schematically illustrating the engine mounted to the wing of an aircraft.

FIG. 2 is a sectional view taken along line 2—2 of FIG. 1, noting the wing being schematically illustrated.

FIG. 3 is an end view of one of the joints of the mount system, and

FIG. 4 is a sectional view taken along line 4—4 of FIG. 3.

DESCRIPTION OF THE PREFERRED EMBODIMENT

Reference is made to FIGS. 1 and 2 showing a gas turbine engine 10 shown in phantom supported in nacelle 12 by the cantilevered mounting system generally illustrated by reference numeral 14 which attaches the engine case to the wing 16. While not limited thereto, the outline of the gas turbine engine in this embodiment represents the configuration of a gas turbine engine similar to the type manufactured by the Pratt and Whitney Division of United Technologies Corporation and is an axial flow fan type of engine having the fan section 18, the compressor section 20, the burner section 22, and the turbine section 24. Typically, this type of engine is mounted to the airframe at two different planes spaced axially relative to the engine axis. The problem solved by this invention is the elimination of the attachment points in one of the planes so that the engine, whose inlet could extend considerably fore of the leading edge 26 of wing 16 can be supported, without having to provide an overhang structure reaching fore of the wing to attach to and carry the load of the engine. As will be more apparent from the description to follow, it will be noted that the major portion of the load is carried by the engine case and attachment, eliminating the necessity of providing load carrying structure in the nacelle.

As can best be seen in FIG. 2, the mounting system comprises yoke 30 which is semicircular in shape and forms a cradle to receive the engine. Yoke 30 essentially transmits the load of the engine to the aircraft major structure via the support members 15 and 17. The engine case carries three recesses 32 formed in a single plane transverse to the axis of the engine, wherein one sits at the bottom and the other two are on diametrically opposed sides at the midpoint of the engine. FIGS. 3 and 4 show one of the joints enlarged and all three being identical to each other, and comprises pin 34 that extends into the aligned recess 32 through complementary bore 36. Bore 36 is frusto conically shaped to receive the complementary shaped shank portion 38 of the pin 34 and serves to align the engine to the yoke when the pin is radially positioned into the recess upon mounting. Ball joints are preferred to account for tolerances in the engine and nacelle. A flat plate 39 suitably bolted to the yoke prevents the pin from slipping out.

A ball joint 40 comprising partially spherical ball 42 mounted on pin 34, and seat 44 supports the engine case. Another flat plate 48 similar to flat plate 39 is suitably bolted to the engine case and likewise prevents the seat 44 from slipping out.

Pin 34 extends a slight distance short of the bottom 50 of recess 32 to permit the engine to grow thermally. However, except for this growth provision, the tolerance of the joints are such that there is relatively no slippage at the joints so that all the loads, (thrust, vertical, side and torque) are transmitted through these points and since these points lie substantially in a single plane, their forces are resolved in a single plane.

In the engine installation described herein the engine case or duct is considerably long as it extends from the fan section to aft of the turbine section. Also it will be noted that the mounts are aft of the C.G., cantilevering the engine, and lie in a plane extending through the engine's main rear bearing supporting structure. Hence, in this installation the total engine thrust load would be transmitted through the fan exit case 52 (FIG. 1) and be distributed uniformly into the fan duct case, to be reacted by the airframe support structure at the swivel trunnions in yoke 30. The uniform load distribution thus attained would minimize case distortion and the associated detrimental effect on internal engine running clearances.

It should be understood that the invention is not limited to the particular embodiments shown and described herein, but that various changes and modifications may be made without departing from the spirit or scope of this novel concept as defined by the following claims.

We claim:

1. A support system to mount a turbine type power plant to aircraft structure wherein the power plant includes an outer case having a given annular portion adapted to receive the support system, a yoke for partially receiving said annular portion of said power plant case, a first pin at the bottom of said yoke extending into a recess formed in said case in said annular portion, a second and third pin diametrically opposing each other and equidistance from said first pin at the side of said yoke extending into recesses formed in said annular portion of said casing, said first, second and third pins lying in a plane transverse to the power plant axis being the sole support for the thrust, vertical, side and torque loads, said first, second and third pins each having partially spherical balls pivotally mounted on the ends thereof, and each of said pins having a shank portion having a frustoconical shape and a complementary opening in said yoke for accommodating said shank, means for securing said yoke to said aircraft structure.

2. A suppport system as claimed in claim 1 wherein said first, second and third pins extend radially into said recesses but spaced from the bottom wall thereof to accommodate thermal growth.

3. A support system as claimed in claim 1 wherein said pins are retractable and means for retaining said pins in position when mounted.

4. A support system to mount a turbine type power plant to aircraft structure wherein the power plant includes an outer case having a given annular portion adapted to receive the support system, said power plant being supported to the wing of the aircraft and said annular portion being positioned rearwardly of the center of gravity of said power plant to cantilever mount said power plant to permit the inlet of the power plant to project a relatively large distance ahead of said wing, a yoke for partially receiving said annular portion of said power plant case, a first pin at the bottom of said yoke extending into a recess formed in said case in said annular portion, a second and third pin diametrically opposing each other and equidistance from said first pin at the side of said yoke extending into recesses formed in said annular portion of said casing, said first, second and third pins lying in a plane transverse to the power plant axis being the sole support for the thrust, vertical, side and torque loads, said pins being retractable, means retaining said pins in position when mounted, and means for securing said yoke to said aircraft structure.

5. A support system as claimed in claim 4 wherein said first, second and third pins extend radially into said recesses but spaced from the bottom wall thereof to accommodate thermal growth.

6. A support system as claimed in claim 4 including partially spherical balls pivotally mounted on the end of said first, second and third pins and a seat in said recesses accommodating said partially spherical balls.

* * * * *